(12) United States Patent
Jacobsson

(10) Patent No.: US 6,691,982 B1
(45) Date of Patent: Feb. 17, 2004

(54) VALVE BODY

(75) Inventor: Sven-Åke Jacobsson, Säffle (SE)

(73) Assignee: CCI Valve Technology AB (SE)

( * ) Notice: Subject to any disclaimer, the term of this patent is extended or adjusted under 35 U.S.C. 154(b) by 0 days.

(21) Appl. No.: 10/332,546

(22) PCT Filed: Jun. 7, 2002

(86) PCT No.: PCT/SE02/01112
§ 371 (c)(1),
(2), (4) Date: Jan. 9, 2003

(87) PCT Pub. No.: WO02/101271
PCT Pub. Date: Dec. 19, 2002

(30) Foreign Application Priority Data

Jun. 8, 2001 (SE) .............................. 0102041

(51) Int. Cl.⁷ ................................ F16K 3/24
(52) U.S. Cl. ................. 251/333; 251/362; 251/363
(58) Field of Search ................ 251/318–334, 251/356–368

(56) References Cited

U.S. PATENT DOCUMENTS

| 3,211,419 A | | 10/1965 | Klinger-Lohr | 251/186 |
|---|---|---|---|---|
| 3,809,362 A | * | 5/1974 | Baumann | 251/332 |
| 3,933,279 A | * | 1/1976 | Maier | 222/631 |
| 3,945,604 A | * | 3/1976 | Clarkson | 251/328 |
| 5,018,664 A | * | 5/1991 | Butler | 251/363 |
| 5,918,628 A | * | 7/1999 | Harding | 137/512.1 |
| 5,924,672 A | * | 7/1999 | Crochet et al. | 251/63.6 |
| 6,250,603 B1 | * | 6/2001 | Knowles et al. | 251/149.1 |

FOREIGN PATENT DOCUMENTS

GB 2033549 5/1980

* cited by examiner

Primary Examiner—Paul J. Hirsch
(74) Attorney, Agent, or Firm—Ostrolenk, Faber, Gerb & Soffen, LLP

(57) ABSTRACT

The invention relates to a valve, comprising a valve body for controlling a medium flowing through the valve, a valve housing (3), in which the valve body (1), which has at least one gasket (4) for sealing cooperation with the valve housing (3) or where appropriate with a cage (5) arranged in the valve housing, is axially displaceable by a spindle (6) in the direction towards and from a valve seating (7) in the valve. The gasket (4) extends peripherally around the circumference of the valve body (1) and is expandable in the radial direction to tight abutment against the valve housing (3) or the cage (5) arranged in the latter through axial pressing of at least one press member (9') acting on the gasket (4) when the valve body (1) is just before and/or in its closing position.

6 Claims, 3 Drawing Sheets

VALVE BODY

Figure 1:
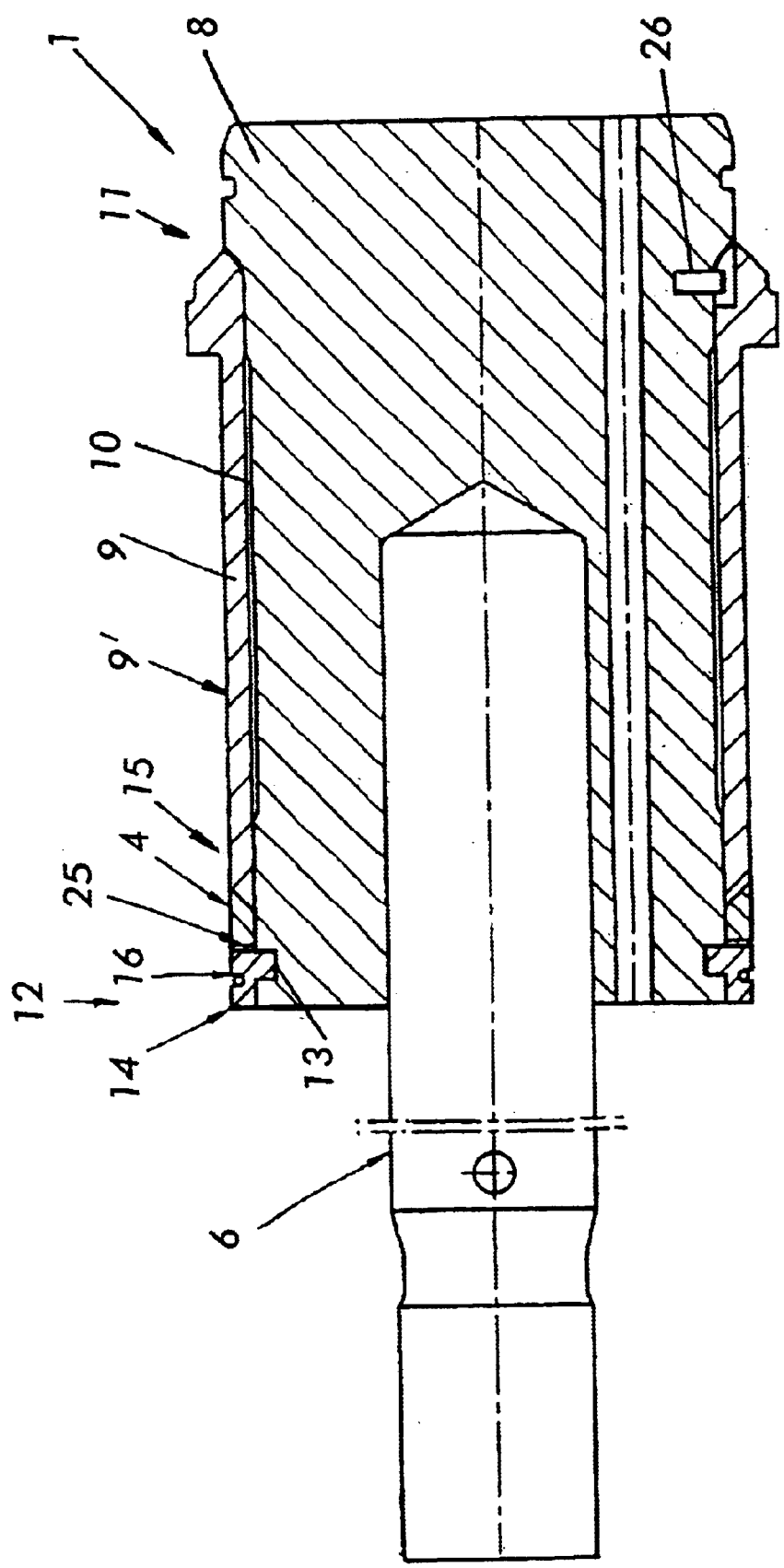

The present invention relates to a valve body for controlling a medium flowing through a valve, which valve comprises a valve housing, in which the valve body, which has at least one gasket for sealing cooperation with the valve housing or where appropriate with a cage arranged in the valve housing, is axially displaceable by means of a spindle in the direction towards and from a valve seating in the valve.

For certain valve applications currently on the market it is required by the person using these that the valve should be tight, which normally gives a unidirectional very strong setting force. To achieve as weak setting force as possible one uses a so called balanced valve, which is achieved by a connection channel extending between the low pressure side of the valve body and the confined volume, which is above the valve body and within the valve lid. Up to now, these two mentioned variants of valve applications have not been possible to combine completely.

The object of the present invention, therefore, is to provide a tight valve body and more particularly a balanced, tight valve body, which consists of a complete valve package, in which the components of the valve body completely seal, when the valve body is just before and/or in its closing position in the valve housing at the same time as such a small frictional wearing as possible arises on the gasket, when the valve is working outside its closing positions. The characterizing features of the invention are stated in the accompanying claims.

Thanks to the invention a new type of valve body for controlling a medium of the above mentioned kind flowing through a valve, which valve body in an excellent manner fulfills its purposes and in addition at the same time is simple and cheap to manufacture. The valve body according to the invention specifically has a press member, preferably In the form of a sleeve, which runs externally on a central valve cone, and a gasket made of a material that when influenced by forces from the sleeve can expand radially outwardly as well as inwardly. In a preferred embodiment the gasket is fixable in its position with the aid of a split ring, which is axially locked through assemblage in a groove in the valve cone. Thanks to this solution, when the valve cone reaches its closing position against the valve seating it results in that the sleeve slides on the valve cone and transfers forces against and compresses the gasket, which then expands radially in its space defined by the sleeve, the split ring, the valve cone and the wall present within the valve. The gasket in question creates a strong surface pressure on the surfaces defining the closed volume.

In the opened valve position when the valve is in operation the sleeve is no longer in contact with the valve seating, wherein the sleeve no longer transfers any forces that influences the gasket and will not create any surface pressures at its confining surfaces as well. By eliminating or delimiting the surface pressure against the gasket, the friction against the present valve wall, towards which the valve body runs, will be very low, wherein also the required setting force of the valve can be kept low at the same time as the wear of for example the gasket is radically reduced. By the structure in question only one force against the gasket is created when the valve is closed whereas when the valve is open and working this force against the gasket has been completely eliminated, wherein no frictional forces can be generated at the same time as the structure in question compensates the wear of the gasket through the axial movement of the sleeve.

Figure 2:
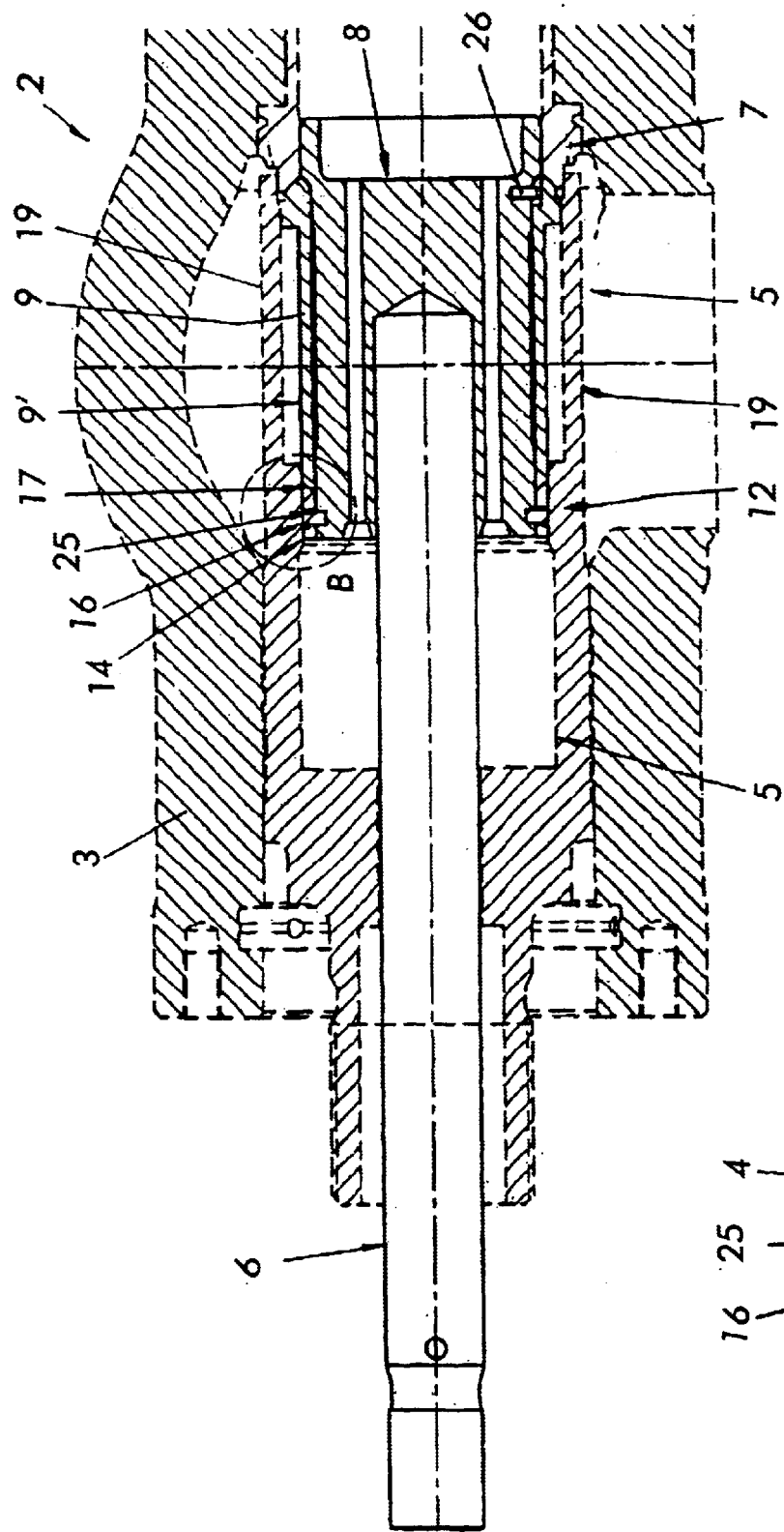
Figure 2A:
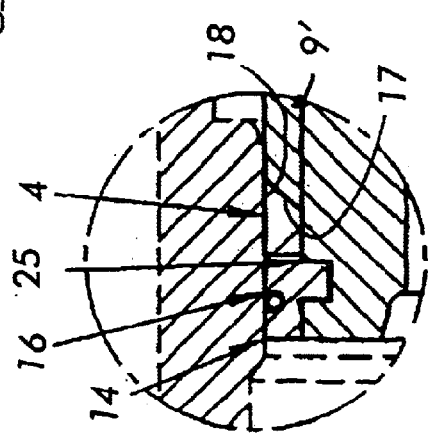
Figure 3:
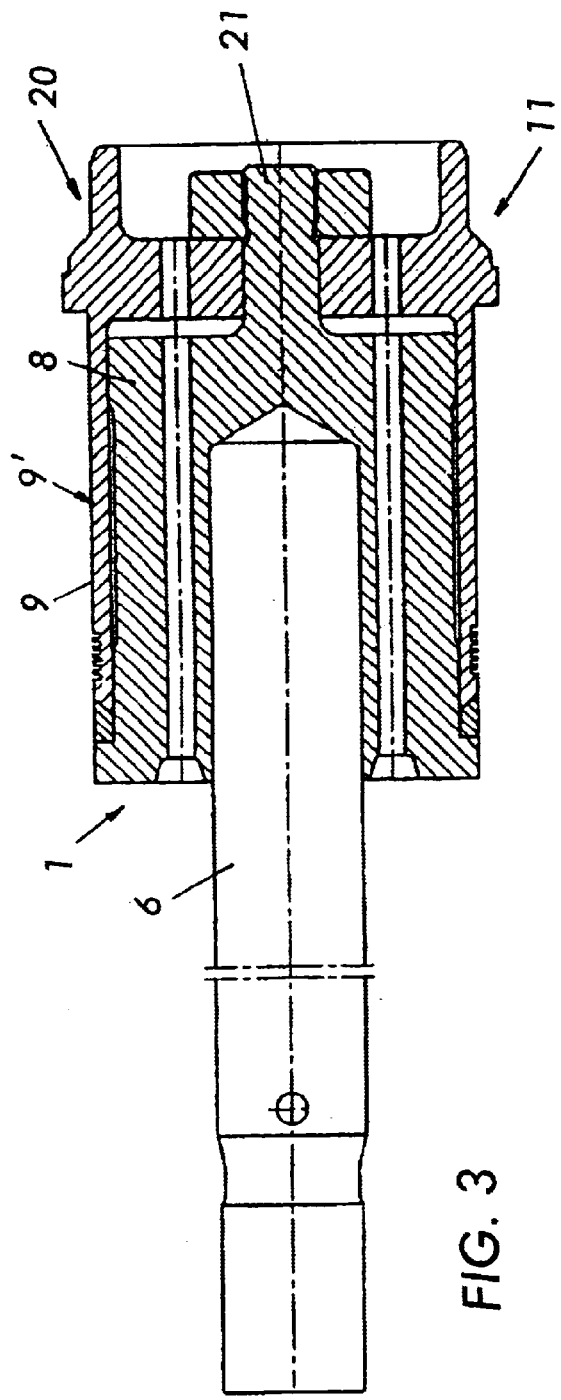
Figure 4:
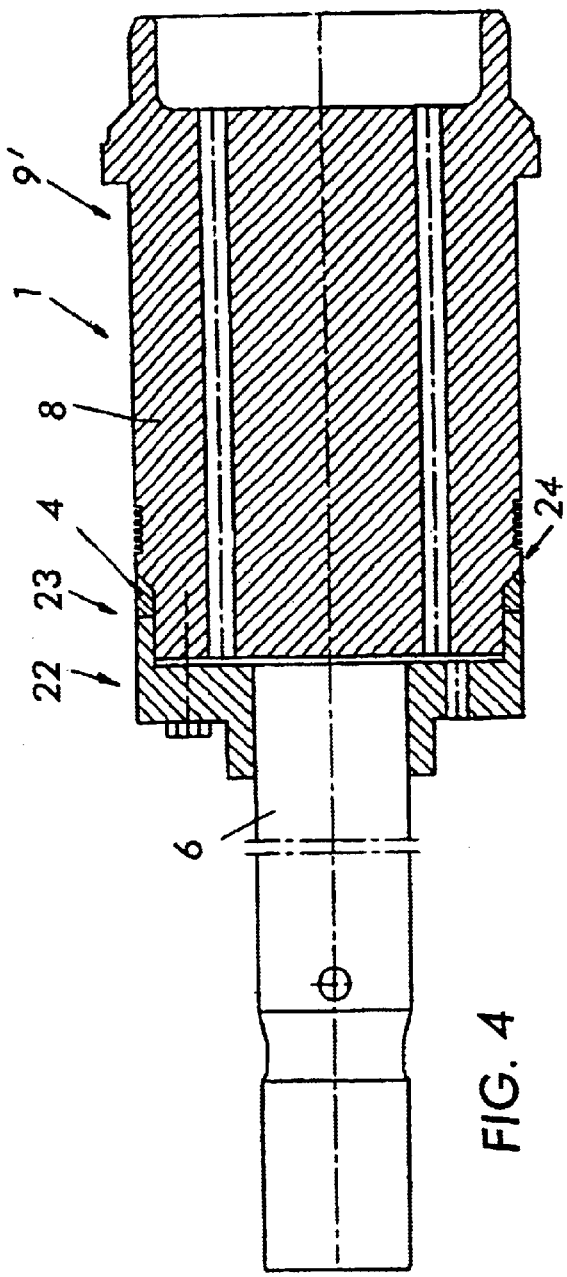

The invention is described in more detail below with the aid of some preferred embodiments with reference to the accompanying drawings, in which FIG. 1 schematically shows a cross sectional view through a valve body according to the invention and according to a first embodiment, FIG. 2 schematically shows a cross sectional view through a complete valve with a valve cone according to FIG. 1 mounted therein, FIG. 3 shows an alternative embodiment of a valve body designed according to a second embodiment and FIG. 4 shows a further alternative embodiment of a valve body illustrated in a cross-section.

As appears in more detail from FIG. 1 there is shown in accordance with a first embodiment a valve body 1 according to the invention, intended for mounting in a valve housing 3 of a valve 2, in which the valve body 1, which has at least one gasket 4 for sealing cooperation with the valve housing 3 or where appropriate with a cage 5 arranged in the valve housing, is displaceable axially by means of a spindle 6 in the direction towards and from a valve seating 7 in the valve 2. The valve body 1 according the embodiment shown in FIG. 1 is guided by a spindle 6, as mentioned above, In the valve 2 and Is constituted by a valve cone 8 with a sleeve 9 enclosing the latter and serving as a press member 9', which sleeve 9 is displaceably arranged in a recess 10, which in this embodiment extends almost to the free end 11 of the valve cone 8 to cooperate with a valve seating 7. In the opposite end 12 of the valve cone 8 the sleeve 9 is retained in its recess 10 with the aid of a fixing member 14 arranged in a groove 13. Between this fixing member 14 and the adjacent rear portion 15 of the sleeve 9 the gasket 4 is arranged, which extends around the circumference of the valve cone 8. In the example shown a plane gasket 25 is positioned between the gasket 4 and the fixing member 14 to prevent the gasket 4 from being squeezed in the slots that can be formed when the fixing member 14 is constituted by a split ring. To prevent rotation between the sleeve 9 and the valve cone 8 there is a rotational pin 26. The function of the sleeve 9 on the valve cone 8 is to compress the gasket 4 when the sleeve 9 moves towards the gasket 4, which occurs when the valve body 1 is just before and/or in its closing position, so that the gasket 4 expands in its space defined by the sleeve 9, the fixing member 14 with its possible plane gasket 25, the valve cone 8 and the present valve housing wall. As a result, the gasket 4 creates a strong surface pressure on all of its confining surfaces.

In an open valve position, i.e. when the valve 2 is in operation, the sleeve 9 is no longer in contact with the valve seating 7, wherein the sleeve 9 no longer can transfer any force that influences the gasket 4. Then, the sleeve 9 will not create any surface pressure on its confining surfaces and in particular the gasket 4, as well. By eliminating or delimiting the surface pressure of the gasket 4 the friction against the valve housing 3 or where appropriate against the cage 5 arranged in the valve housing will be very low, wherein also the required setting force of the valve 2 can be kept very low at the same time as the wear, especially of the gasket 4, can be radically reduced. In the example shown according to FIG. 1 the fixing member 14 is situated in a groove 13 in the valve cone 8 and in the present case is designed as a split ring, which automatically is kept together when the valve cone 8 is inserted in the valve 2 or is fixed in position with the aid of a locking ring 16. The gasket 4 may be made of an elastic material, for example consisting of a plastic or metallic material and preferably of graphite.

As shown in more detail in FIG. 2 the valve body 1 in this case is mounted in a valve 2, which in turn houses a cage 5 arranged in the valve housing 3. The valve body 1 is displaceable arranged in said cage 5 and the gasket is situated in the rear end 12 of the valve cone 8 at the same time as its front free end 11 is cooperable with a valve seating 7 situated in the valve 2. To give a greater effect of the sealing 4 when it expands in the radial direction the abutting surface 17 of the gasket 4 against the corresponding surface 18 on the sleeve 9 serving as a press member 9' is angled or oblique. In the example shown where the valve cone 8 is arranged in a cage 5 the latter as a plurality of holes 19, which are uncovered when the valve body 1 is displaced from its closed position to its open position.

In FIG. 3 there is shown an alternative embodiment of a valve body 1 according the invention in which the front portion 20 of the sleeve 9 encloses the front end 11 of the valve body and is journalled in the axial direction on a pin 21 centrally protruding from the front free end 11 of the valve body 1. In this example the sleeve 9 generally is designed as a hat instead of ending a short distance before the free end 11 of the valve cone 8, as in the previous embodiment.

In FIG. 4 there is finally shown a further embodiment of the valve body 1 according to the invention in which generally the entire valve cone 8 is designed as a press member movable in the axial direction and is displaceable fixed in position in a sleeve 22 provided with a flange on the spindle 6, which sleeve 22 forms a peripheral shoulder 23 for the gasket 4, which is arranged between this stationary shoulder 23 and a movable shoulder 24 on the press member 9' and between which the gasket 4 is contractible for its radial expansion.

What is claimed is:

1. A valve (2), comprising a valve body for controlling a medium flowing through the valve (2), a valve housing (3), in which the valve body (1), which has at least one gasket (4) for sealing cooperation with the valve housing (3) or where appropriate with a cage (5) arranged in the valve housing, is axially displaceable by means of a spindle (6) in the direction towards and from a valve seating (7) in the valve, characterized in that the gasket (4) extends peripherally around the circumference of the valve body (1) and is expandable in the radial direction to tight abutment against the valve housing (3) or the cage (5) arranged in the latter by axial pressure of at least one press member (9') acting on the gasket (4), when the valve body (1) is just before and/or in its closing position, which press member (9') is constituted by a sleeve (9) extending around the valve body (1), which sleeve (9) transfers a compression force against the gasket (4) when the valve cone (8) reaches its closing position against the valve seating (7) resulting in the radial expansion of the gasket (4), the gasket (4) having an angled or oblique abutment surface (17) for cooperation with a corresponding surface (18) on the press member (9').

2. A valve according to claim 1, characterized in that the sleeve (9) extends around the valve cone (8) to the free end (11) thereof with its front portion (20) for cooperation with the valve seating (7) at the same time as the opposite rear portion (15) of the sleeve (9) extends to the gasket (4) and which parts together are fixed in position side by side of each other within a predetermined displacement distance, which generally corresponds to the contractibility of the gasket (4) on the valve cone (8) in the axial direction through a fixing member (14), which in turn is fixed in the rear end (12) of the valve cone (8) in a groove (13).

3. A valve according to claim 2, characterized in that the sleeve (9) has an axial extension on the valve cone (8) that ends just before its front free end (11) and is displaceable together with the gasket (4) a short distance on the mantle surface of the valve cone (8).

4. A valve according to claim 2, characterized in that the front portion (20) of the sleeve (9) encloses the valve body and is journalled in the axial direction on a pin (21) centrally protruding from the front free end (11) of the valve body (1).

5. A valve according to claim 1, characterized in that the gasket (4) is arranged to slide without any greater friction against the valve housing (3) or the cage (5) arranged in the latter, when the valve (2) is in an open position, i.e. as long as the press member (9') is not in contact with the valve seating (7).

6. A valve according to claim 1, characterized in that the press member (9') is designed as a valve cone and is movably fixed in position in a sleeve (22) provided with a flange on the spindle (6), which sleeve (22) forms a peripheral shoulder (23) for the gasket (4), which is situated between this rigid shoulder (23) and a movable shoulder (24) existing on the press member (9'), between which the gasket (4) is contractible for its radial expansion.

\* \* \* \* \*